United States Patent Office 2,797,181
Patented June 25, 1957

2,797,181
STABILIZED DITHIOCARBAMATE PESTICIDAL COMPOSITION

Roger E. Drexel, Wilmington, Del., assignor to E. I. du Pont de Nemours and Company, Wilmington, Del., a corporation of Delaware No Drawing. Application August 25, 1955,
Serial No. 530,634

7 Claims. (Cl. 167—22)

This invention relates to pesticidal compositions and methods employing aqueous solutions of alkali and alkaline earth metal mono saturated and ethylenically unsaturated lower aliphatic dithiocarbamates, which solutions are stabilized by an increased alkali or alkaline earth metal cation content.

Aqueous solutions of these dithiocarbamates possess excellent activity for the control of soil pests. However, because these dithiocarbamates decompose quite rapidly in aqueous solution, particularly at concentrations lower than about 15% by weight, heretofore it has been impractical to use dilute solutions of these compounds at the low concentrations customarily employed in aqueous pesticidal compositions.

I have discovered that highly stable solutions of the alkali and alkaline earth metal mono saturated and ethylenically unsaturated lower aliphatic dithiocarbamates can be prepared by increasing the alkali or alkaline earth metal cation content above that which would result solely from the presence of the dithiocarbamate compound. In this manner, solutions of improved stability containing any desired amount of the dithiocarbamate can be prepared. Thus, my compositions are aqueous solutions comprising from about 0.1% to 60% by weight of active ingredients and an auxiliary source of cation.

The active ingredients of my compositions are the alkali and alkaline earth metal mono saturated and ethylenically unsaturated lower aliphatic dithiocarbamates where the aliphatic group contains 1 thru 6 carbon atoms. The preferred aliphatic groups are alkyl and alkenyl groups of 1 thru 3 carbon atoms. The preferred active ingredients are the sodium and potassium salts of monomethyl and monoallyl dithiocarbamates.

The auxiliary source of cations for my compositions can be any soluble ionizable neutral or basic compound such as alkali and alkaline earth metal sulfates, nitrates and phosphates. It is usually desirable, although not essential, that the stabilizing cation and the dithiocarbamate metal cation be the same. The preferred sources of cation are those compounds that buffer the solution at a pH of about 10 to 12. Typical of the compounds that can be used are sodium or potassium acetate, chloride, nitrate, carbonate, bicarbonate, sulfate, phosphate, mono acid phosphate and diacid phosphate; and calcium, magnesium, or barium chloride, acetate, nitrate and sulfate. Of course, a compound that forms a precipitate with the dithiocarbamate cation should not be used.

While even small amounts of added cation bring about some degree of stabilization of these dilute dithiocarbamate solutions, ordinarily at least 0.10 mole per liter of the auxiliary cation, and preferably from 0.20 to 1.00 mole per liter are included in my solutions. In general, the amount of excess cation required to give good stability is greater for decreased dithiocarbamate concentrations and for dithiocarbamates with cations of higher valences.

In preparing my stabilized compositions, the auxiliary source of cation can be added to the aqueous medium at any desired time. Preferably, however, it is added to the aqueous medium prior to the formation of a dilute solution of the dithiocarbamate. Thus, the source of cation can be added to a concentrated dithiocarbamate solution, which solution is then diluted with water to the desired low concentration. Alternatively, the auxiliary source of cation can be added to an aqueous medium prior to the preparation of the dithiocarbamate. In this manner, stable solutions of any desired concentration can be prepared directly by reacting a mono saturated or ethylenically unsaturated lower aliphatic amine, carbon disulfide, and alkali metal hydroxide in an aqueous medium containing an auxiliary source of cation.

My method for the control of pests comprises applying the above-described stabilized aqueous dithiocarbamate solutions to a locus to be treated for the control of pests. While this method is generally applicable for the control of a wide variety of fungi and soil pests known to be controlled by the water-soluble dithiocarbamate fungicides, my method is particularly effective in controlling soil pests such as those organisms that cause damping-off (*Rhizoctonia sp.*, *Pythium sp.* and *Fusarium sp.*).

My method is advantageously carried out by spraying the above-described solutions directly on the locus to be treated. Thus, living vegetation can be protected from fungi attack by applying my compositions directly to the plant foliage or on plant seeds, by mixing it with fertilizer that is then applied to the vegetation, by applying it to the soil in which the vegetation is growing or will be planted subsequently, or in any other manner that applies the active ingredient to the locus of the vegetation to be protected. In my pesticidal methods, the active dithiocarbamate is applied to the locus to be treated for the control of pests at a dosage sufficient to exert pesticidal action. In general, in application as a foliar spray for fungicidal control, a dosage or rate from about 1 to 4 pounds per acre of the dithiocarbamate is employed. In application to seed, usually a dosage from 0.5 to 3 ounces per 100 pounds of seed is used. In application to soil for the control of soil pests, the dosage required ordinarily ranges from about 5 to 100 pounds per acre of soil to be treated, with the alkali and alkaline earth monomethyl dithiocarbamates being particularly effective in this treatment.

The optimum dosage, of course, is largely determined by and dependent upon the particular material to be treated, the dithiocarbamate employed, the method of application and, in the case of application to vegetation and seeds, the susceptibility of the particular vegetation to the dithiocarbamate, the state and condition of growth of the vegetation to be treated, and the climatic conditions. The optimum amount to be applied in each case can be determined readily by those skilled in the art by conventional means.

In order that this invention can be better understood, the following examples are given in addition to those set forth above:

Example 1

To 200 parts by weight of an aqueous monomethylamine solution containing 31 parts by weight of monomethylamine is added dropwise with stirring 76 parts by weight of carbon disulfide. During the addition the temperature of the aqueous mass is maintained below the boiling point of carbon disulfide by external cooling. After completing this addition, 241 parts by weight of a solution containing 41 parts by weight of 98% sodium hydroxide in 200 parts by weight of water is added dropwise to the amine-carbon disulfide reaction product with continued cooling and stirring.

After two hours to allow the reaction to go to completion, there is added a solution of 510 parts by weight of sodium acetate in 1000 parts by weight of water. There is thus obtained an aqueous solution of sodium monomethyl dithiocarbamate containing sodium acetate as a stabilizing agent.

This solution is diluted with 2770 parts of water to give a solution whose sodium monomethyl dithiocarbamate concentration is 3% by weight. After prolonged storage this dilute solution retains to a high degree its fungicidal activity indicating that there is no substantial decomposition of the active ingredient.

This stabilized 3% sodium monomethyl dithiocarbamate solution is sprayed onto the surface of a plowed field at a dosage of 50 pounds per acre of the active ingredient. The field is known to be infested with the damping-off organisms (*Rhizoctonia sp.*, *Pythium sp.* and *Fusarium sp.*). Seven days after treatment, the field is planted in tobacco. An excellent stand of healthy tobacco plants grows on this treated field. In contrast, an extremely poor stand of tobacco plants is obtained on an adjacent untreated similarly infested field planted at the same time.

*Example 2*

To a solution of 31 parts by weight monomethylamine in 500 parts by weight of water is added 90 parts by weight potassium mono acid phosphate. To this solution is added dropwise 76 parts by weight of carbon disulfide while stirring and maintaining the temperature below the boiling point of the carbon disulfide. After this addition is completed, 557 parts by weight of a solution of 57 parts by weight potassium hydroxide in 500 parts by weight of water is added dropwise to the amine solution while stirring and cooling are continued. There is thus obtained a stabilized aqueous solution of potassium monomethyl dithiocarbamate containing potassium mono acid phosphate.

This solution is then applied at a rate of 75 pounds per acre of the active ingredient onto the surface of a field known to be infested with rootknot nematode (*Meloidogyne sp.*) and cotton wilt pathogen (*Fusarium oxysporium var. vasinfectum*). Seven days after this treatment the field is planted with Deltapine variety cotton.

Three weeks after planting, the cotton plants are examined for disease. While a high percentage of healthy plants is obtained from the treated field, practically all of the cotton plants planted in an adjacent untreated similarly infested field are infested with cotton wilt.

*Example 3*

1000 parts by weight of an aqueous solution of calcium monomethyl dithiocarbamate (15% by weight) is stabilized by adding 164 parts by weight calcium nitrate and 836 parts by weight water. After prolonged storage, this solution remains highly active. This solution, when diluted to 0.4% by weight concentration of the dithiocarbamate and sprayed on tomato foliage, is effective in controlling late blight fungus (*Phytophthora infestans*).

*Example 4*

1000 parts by weight of an aqueous solution of barium methyl dithiocarbamate (10% by weight) is stabilized by adding 92 parts by weight barium nitrite.

*Example 5*

1000 parts by weight of an aqueous solution of potassium allyl dithiocarbamate (30% by weight) is stabilized by the addition of 1000 parts by weight potassium acetate. This solution is then diluted to 5% potassium allyl dithiocarbamate. Excellent stability is maintained in the resultant solution.

This stabilized 5% potassium allyl dithiocarbamate solution is applied at a rate of 75 pounds per acre to the surface of a field known to be infested with rootknot nematode (*Meloidogyne sp.*). Seven days after this treatment the field is planted with Early Fortune variety cucumbers. Four weeks after planting, the cucumber plants are removed from the soil and examined for the amount of rootknot present. Whereas these cucumber plants have 0% rootknot count, cucumber plants taken from a similarly infested untreated field have a 100% rootknot count.

I claim:

1. A pesticidal composition comprising an aqueous solution containing a material selected from the group consisting of salts of alkali and alkaline earth metals in sufficient amount to contribute to the solution at least 0.10 mol per liter of the cation of said salt, and a dithiocarbamate selected from the group consisting of alkali and alkaline earth metal mono lower saturated and ethylenically unsaturated aliphatic dithiocarbamates.

2. A pesticidal composition in accordance with claim 1 containing said salt in sufficient amount to contribute to solution from 0.10 to 1.0 mol per liter of the cation of said salt.

3. A pesticidal composition in accordance with claim 1 wherein the dithiocarbamate is an alkali metal monomethyl dithiocarbamate.

4. A pesticidal composition in accordance with claim 1 wherein the dithiocarbamate is an alkaline earth metal monomethyl dithiocarbamate.

5. A pesticidal composition in accordance with claim 1 having a pH in the range of about pH 10 to pH 12.

6. A pesticidal composition in accordance with claim 3 wherein the auxiliary source of cation is a soluble ionizable alkali metal salt.

7. A pesticidal composition in accordance with claim 4 wherein the auxiliary source of cation is a soluble ionizable alkaline earth metal salt.

References Cited in the file of this patent

UNITED STATES PATENTS

| | | |
|---|---|---|
| 2,286,738 | Hill | June 16, 1942 |
| 2,474,412 | Bersworth | June 28, 1949 |

FOREIGN PATENTS

| | | |
|---|---|---|
| 8,103 of 1932 | Australia | May 4, 1933 |